United States Patent
Burton et al.

(10) Patent No.: US 6,922,741 B2
(45) Date of Patent: Jul. 26, 2005

(54) METHOD AND SYSTEM FOR MONITORING DMA STATUS

(75) Inventors: Robert Burton, Gilbert, AZ (US); Jennifer Wang, Tempe, AZ (US); Aniruddha Joshi, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 17 days.

(21) Appl. No.: 10/060,336

(22) Filed: Feb. 1, 2002

(65) Prior Publication Data
US 2003/0149808 A1 Aug. 7, 2003

(51) Int. Cl.[7] .............................................. G06F 13/28
(52) U.S. Cl. ........................... 710/28; 710/24; 710/25; 710/27
(58) Field of Search ................................... 710/22–28

(56) References Cited

U.S. PATENT DOCUMENTS

| 4,482,982 A | * 11/1984 | Yu et al. ...................... 710/58 |
| 4,716,523 A | * 12/1987 | Burrus, Jr. et al. ......... 364/200 |
| 5,333,274 A | * 7/1994 | Amini et al. ................ 395/275 |
| 5,499,384 A | * 3/1996 | Lentz et al. ................. 395/821 |
| 5,659,720 A | 8/1997 | Fiacco et al. ............... 395/557 |
| 5,826,107 A | * 10/1998 | Cline et al. ................. 395/847 |
| 6,081,852 A | * 6/2000 | Baker ........................... 710/24 |
| 6,484,217 B1 | * 11/2002 | Fuente et al. ................ 710/15 |

FOREIGN PATENT DOCUMENTS

EP    0 481 908    4/1992

OTHER PUBLICATIONS

Patent Abstracts of Japan, vol. 2002, No. 02, Apr. 2, 2002 & JP 2001 297056 A (Canon Inc), Oct. 26, 2001.

* cited by examiner

Primary Examiner—Jeffrey Gaffin
Assistant Examiner—Alan S Chen
(74) Attorney, Agent, or Firm—Blakely, Sokoloff, Taylor & Zafman LLP

(57) ABSTRACT

Embodiments of the invention provide a status register for each channel of a DMA controller. The status register may be used to monitor and record events that occur during DMA data transfers, including timeouts and aborts.

23 Claims, 2 Drawing Sheets

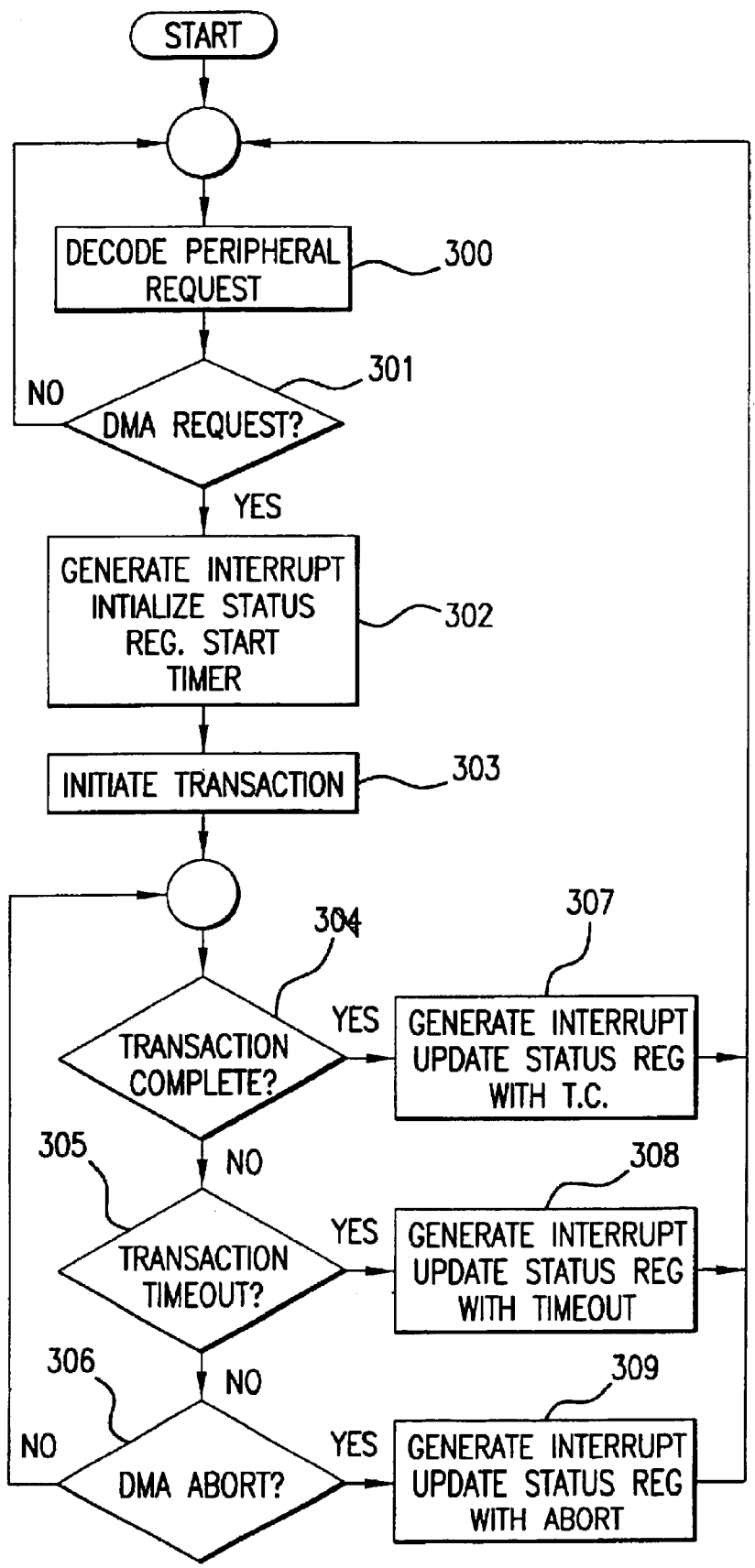

METHOD AND SYSTEM FOR MONITORING DMA STATUS

FIELD OF THE INVENTION

The present invention relates to computer systems, and more particularly to a method and system for monitoring events that occur during the operation of a DMA (Direct Memory Access) controller of a computer system.

BACKGROUND OF THE INVENTION

DMA controllers are used in known computer systems for offloading, from a CPU, the tasks of performing data transfers to and from memory. If the CPU itself were used to transfer, for example, each byte of a program stored on an external floppy disk into the system memory for execution, operations would be severely slowed and overall system performance severely degraded. A DMA controller can instead be used to load the program, freeing the CPU for other operations.

Typically, the CPU gives the DMA controller a start address and a byte count for data to be transferred to or from the memory. The DMA controller then proceeds to perform the data transfer.

Among disadvantages of known systems, however, is that events that may occur during transfers of data by the DMA controller are not adequately monitored or signaled. In known systems, for example, only the start and the completion of a data transfer are signaled. The completion event may be signaled, for example, by generating an interrupt or by setting a status bit in a register that is polled by the CPU.

However, other events that impact system availability may occur during DMA data transfers, and need to be tracked. One example of such an event is a data transfer being aborted. An abort signal may be generated by a peripheral device to which a DMA transfer has begun, to signal that the DMA transfer has been stopped short of successful completion. The peripheral device might abort a DMA transfer, for example, because of a software or hardware failure. In conventional systems, such an abort signal may be treated as equivalent to a completion signal indicating a successful transfer of data. Thus, information which could be useful in identifying failing devices or system failures may be lost.

Another example of such an event is a DMA transfer which is begun but never completed (either successfully or unsuccessfully). A DMA controller might, for instance, set a status bit indicating that data transfer to a peripheral device had begun, but the peripheral device might not be ready to receive the data, or might have failed during the data transfer. The DMA controller might, in such a situation, continually attempt to send data to the device, but unsuccessfully because the device is not ready or has failed. The status bit would continue to indicate that a data transfer was underway, while in fact no data transfer was occurring. This would waste DMA resources, since the DMA channel attempting to send the data could be used for other data transfers.

A mechanism that generates a "timeout" is known for handling such situations. A timeout is a signal, typically an interrupt, generated when an operation does not complete in a time allotted for it. Conventional DMA controllers typically do not generate timeouts for stalled or incomplete data transfers as described above.

Additionally, DMA transfers may suffer from "unfair" bus arbitration. That is, a peripheral device that needs to transfer data to or from the memory may be connected to a bus shared with other devices, but access to the bus for the DMA controller, for purposes of effecting the data transfer, may be inadequate or unduly delayed.

A method and system are needed that address the foregoing concerns.

BRIEF DESCRIPTION OF THE DRAWINGS

FIG. 3 shows a process flow according to embodiments of the invention.

DETAILED DESCRIPTION

According to embodiments of the invention, a status register configured to monitor DMA activity may be provided. The status register may record events that occur during data transfers by a DMA controller. Data transfers performed by a DMA controller may be referred to in the art as "transactions." The status register may be configured to record events including aborts, transaction completions, and timeouts.

Figure 1:
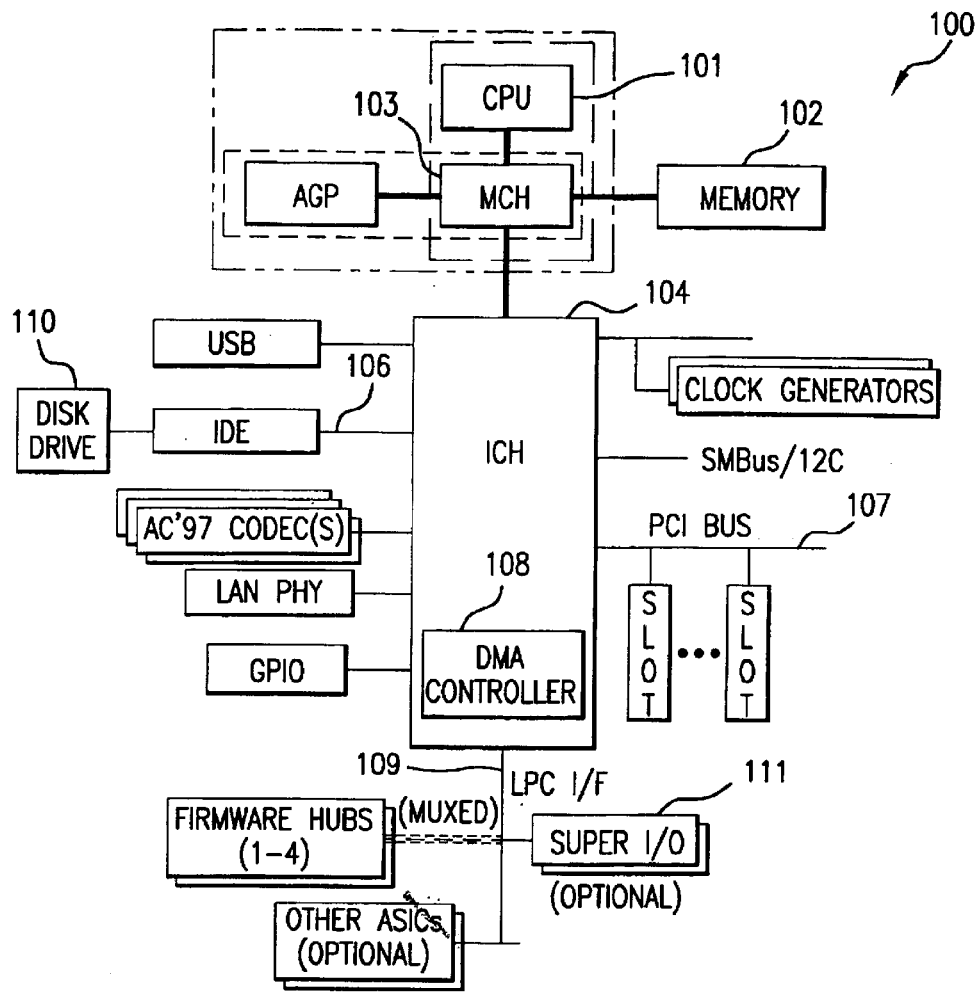
FIG. 1 shows one possible configuration of a computer system according to embodiments of the invention.

FIG. 1 illustrates one possible hardware platform for implementing embodiments of the invention. FIG. 1 shows a computer system 100 with an Intel ® Hub Architecture. This known architecture may comprise a CPU 101 coupled to a MCH (Memory Control Hub) 103 coupled to a memory 102. The MCH 103 may further be coupled to an ICH (I/O Control Hub) 104 comprising a DMA controller 108. The ICH 104 may further be coupled to a PCI (Peripheral Component Interconnect) bus 107, a LPC (Low Pin Count) bus 109 and an IDE (Integrated Drive Electronics) bus 106.

The ICH 104 may receive requests from peripheral devices connected to the PCI, LPC and IDE buses, or other buses, not shown. Examples of peripheral devices include a disk drive 110, shown connected to the IDE bus 106, and "super I/O" 111, shown connected to the LPC bus 109. The super I/O block 111 could include, for example, a UART (Universal Asynchronous Receiver/Transmitter). Among the requests received from peripheral devices by the DMA controller 108 may be DMA requests, or, more particularly, requests to the DMA controller 108 to perform data transfers from a requesting peripheral device to the memory 102, or from the memory 102 to a requesting peripheral device. For example, when a FIFO buffer of the UART is full, the UART may issue a DMA request to have the contents of the FIFO buffer transferred to the memory 102.

Figure 2:
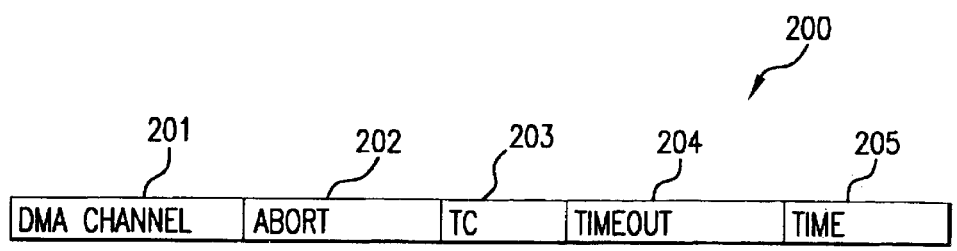
FIG. 2 shows one possible configuration of a status register according to embodiments of the invention.

The ICH 104 may include logic configured to record events associated with operations of the DMA controller to transfer data between the peripheral devices and the memory 102 in accordance with DMA requests, as described in greater detail in the following. A DMA channel may be provided for each peripheral device connected to the PCI, LPC and IDE buses, or other bus. According to embodiments of the invention, a status register for each DMA channel may be provided. FIG. 2 shows one possible configuration of a status register 200 that could be provided for each DMA channel. The status register 200 includes a channel identifier field 201, an abort indicator field 202, a transaction complete (TC) indicator field 203, a timeout indicator field 204, and a time field 205.

When the DMA controller 108 receives a DMA request, a start time corresponding to the start of the data transfer may be written to the time field 205. Concurrently, a timer (not shown) may be started. The timer may measure the duration of a period established for determining when a timeout event has occurred. More particularly, if the TC field 203 is not written to after a predetermined period of time to indicate successful completion of the transaction, it may be determined that a timeout event has occurred.

If the transaction completes successfully, the TC field 203 may be updated to indicate successful completion of the transaction. On the other hand, if an abort or timeout event occurs, the abort field 203 or timeout field 204 may be respectively updated to indicate these events.

When the TC field 203, abort field 202 or timeout field 204 are updated, an interrupt may be generated. In response to the interrupt, the CPU 101 may read the corresponding status register. If the abort field 202 or timeout field 204 have been updated, this information may be used by system management software to determine an appropriate course of action. For example, an error message may be generated to notify a user that a particular device has failed, or that a particular device has failed a number of times that exceeds a predetermined threshold number. This information may be used to determine that the device should be reset or replaced, for example, or in diagnosing recurring system problems. Alternatively, such information could be used to determine that the system should be re-booted.

FIG. 3 illustrates a process according to embodiments of the invention.

As shown in blocks 300 and 301, a request from peripheral devices connected to buses 106, 107 or 109 may be received by the DMA controller 108, and decoded to determine whether the request is a DMA request. The operations represented in blocks 300 and 301 may be repeated to continually check for the presence of a DMA request.

If the request is a DMA request, the DMA request may specify the DMA channel assigned to the requesting peripheral device. As shown in block 302, an interrupt may be generated, to cause the CPU to initialize the status register corresponding to the DMA channel specified in the DMA request. Alternatively, the DMA controller may initialize the status register, without involving the CPU 101. The CPU 101 may have previously programmed the DMA controller 108 with the byte count, starting memory address, and direction of the data transfer requested. As noted above, a timer may also be started to measure a period for determining whether a timeout has occurred.

A transaction may then be initiated in response to the DMA request, as shown in block 303. As shown in blocks 304–309, the status of the transaction resulting from the DMA request may be monitored. More particularly, a sequence of tests as shown in blocks 304–306 may be continually applied to determine the status of the transaction associated with the request.

A test as shown in block 304 may be performed in order to determine whether the transaction has successfully completed. Such a determination could be made, for example, based on the byte count supplied by the CPU as described above. The DMA controller 108 keeps track of how many bytes have been transmitted or received during the transaction. Once the DMA controller 108 has transmitted or received the number of bytes specified in the byte count, an interrupt may be generated and the TC field of the corresponding status register may be appropriately updated to record the successful completion of the transaction, as shown in block 307.

If the test shown in block 304 does not indicate that a transaction complete has occurred, as test as shown in block 305 may be performed to determine whether a transaction timeout has occurred. Such a determination could be made as described above, wherein if a transaction complete is not recorded in the corresponding status register after a predetermined period of time, it may be determined that a timeout event has occurred. If so, an interrupt may be generated and the timeout indicator field 204 of the corresponding status register may be appropriately updated to record the timeout, as shown in block 308.

If the test as shown in block 305 does not indicate that a transaction timeout has occurred, a test as shown in block 306 may be performed to determine whether a DMA abort has occurred. A DMA abort would typically be indicated by an abort signal generated by the peripheral device and placed on a bus decoded by the ICH 104. If an abort signal is decoded on the bus, an interrupt may be generated and the abort indicator field 204 of the corresponding status register may be appropriately updated to record the abort, as shown in block 309.

As noted above, blocks 304–306 may continue to be executed until either a transaction complete, a transaction timeout, or a DMA abort are detected. Then, the process may return to blocks 300 and 301 to continually check for the presence of a DMA request.

In view of the foregoing, it may be appreciated that a method and system have been disclosed for monitoring and recording events that occur during DMA data transfers. Information obtained by monitoring and recording events as described may assist in diagnosing system problems and thereby increasing system reliability and availability.

Additionally, embodiments of the invention as discussed above address the problem of unfair bus arbitration. Notification to the DMA controller of conditions indicative of unfair bus arbitration could be carried out via the same technique as applied, for example, in the event of a timeout. While typically the DMA controller would not be able to distinguish between unfair bus arbitration and an unresponsive device, there are other mechanisms available for determining whether a device that may be subject to unfair bus arbitration is functioning properly. System management software, for example, could be configured to distinguish a difference between a failed device and unfair bus arbitration.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method comprising:
   providing a status register for each channel of a DMA controller;
   recording, in said status register, events that occur during a data transfer performed by said DMA controller, wherein said events include a timeout; and
   generating an error message when a number of aborts or timeouts recorded in said status register exceeds a predetermined number.

2. The method of claim 1, wherein said events further include an abort.

3. The method of claim 1, wherein said recording comprises:
   receiving a request on a bus connected to a peripheral device;
   determining whether said request is a DMA request; and monitoring a status of a data transfer resulting from said DMA request.

4. The method of claim 3, further comprising:
if a timeout or an abort occurs during said monitoring:
generating an interrupt; and
recording said timeout or abort in said status register.

5. A system comprising:
a memory;
a peripheral device;
a bus coupled to said peripheral device;
a DMA controller coupled to said bus and said memory to transfer data between said peripheral device and said memory;
a status register to record events associated with operations of said DMA controller and to record a number of occurrences of the events, the events including a timeout and an abort; and
logic to determine if a number of aborts or timeouts recorded in said status register exceeds a predetermined number.

6. The system of claim 5, wherein said logic generates an error message whenever the number of aborts and timeouts recorded in said status register exceeds the predetermined number.

7. The system of claim 5, further comprising logic to:
receive a request on said bus;
determine whether said request is a DMA request; and
monitor a status of a data transfer resulting from said DMA request.

8. The system of claim 7, wherein said logic further to, if a timeout or an abort occurs during said monitoring:
generate an interrupt; and
record said timeout or abort in said status register.

9. The system of claim 5, wherein said status register includes at least a channel identifier, an abort indicator, and a timeout indicator.

10. The system of claim 5, wherein said bus is one of a PCI bus, a LPC bus, and an IDE bus.

11. A method for increasing availability and reliability of a computer system, comprising:
monitoring events associated with the operations of a DMA controller of computer system, said events including timeouts and aborts;
recording a number of occurrences of said timeouts and aborts; and
determining if the number of occurrences of aborts and timeouts exceeds a predetermined number.

12. The method of claim 11, wherein said monitoring comprises:
determining whether a transaction performed by said DMA controller has completed successfully; and
if not, determining whether a timeout or an abort has occurred.

13. The method of claim 11, wherein recording the number of occurrences of said timeouts and aborts comprises:
writing to a status register associated with said DMA controller to indicate the occurrence of a timeout or an abort.

14. the method of claim 11, further comprising generating an error message to notify a user of said system of the occurrence of a timeout or an abort.

15. An apparatus, comprising:
a memory;
a peripheral device;
a bus coupled to said peripheral device; or status register;
a direct memory access controller coupled to said memory and to said bus to transfer data between said peripheral device and said memory;
means for recording events associated with operations of said direct memory access controller and to record a number of occurrences of the events, the events including a timeout and an abort;
means to determine if a number of aborts or timeouts recorded exceeds a predetermined number; and
means to generate an error message whenever the number of aborts and timeouts recorded in said status register exceeds the predetermined number.

16. The apparatus of claim 15, further comprising a logic capable circuit to:
receive a request on said bus;
determine whether the request is a direct memory access request; and
monitor a status of a data transfer resulting from the direct memory access request.

17. The apparatus of claim 16, wherein said logic circuit is further capable to, if a timeout or an abort occurs during the monitoring:
generate an interrupt; and
record said timeout or abort in said status register.

18. The apparatus of claim 15, wherein said means for recording includes at least a channel identifier, an abort indicator, and a timeout indicator.

19. The apparatus of claim 15, wherein said bus is at least one of a PCI bus, a LPC bus, or an IDE bus.

20. A method comprising:
recording events including timeouts and aborts that occur during a data transfer performed by the direct memory access controller for at least one or more channels of a direct memory access controller; and
generating an error message when a number of timeouts and aborts recorded exceeds a predetermined number.

21. The method of claim 20, further comprising monitoring events associated with the operations of the direct memory access controller.

22. The method of claim 20, wherein said recording comprises:
receiving a request on a bus connected to a peripheral device;
determining whether the request is a direct memory access request; and
monitoring a status of a data transfer resulting from the direct memory access request.

23. The method of claim 22, further comprising, if an event occurs during said monitoring:
generating an interrupt; and
recording the event.

* * * * *